United States Patent
Engels et al.

(10) Patent No.: US 10,676,844 B2
(45) Date of Patent: Jun. 9, 2020

(54) LOW CREEP FIBER

(71) Applicant: DSM IP Assets B.V., Heerlen (NL)

(72) Inventors: Tom Antonius Philomena Engels, Echt (NL); Gert De Cremer, Echt (NL); Romain Berthoud, Echt (NL); Roman Stepanyan, Echt (NL); Peter Roozemond, Echt (NL); Filip Stefan Emiel Oosterlinck, Echt (NL); John Richard Severn, Echt (NL)

(73) Assignee: DSM IP ASSETS B.V., Heerlen (NL)

( * ) Notice: Subject to any disclaimer, the term of this patent is extended or adjusted under 35 U.S.C. 154(b) by 172 days.

(21) Appl. No.: 15/781,789

(22) PCT Filed: Dec. 12, 2016

(86) PCT No.: PCT/EP2016/080569
§ 371 (c)(1),
(2) Date: Jun. 6, 2018

(87) PCT Pub. No.: WO2017/102618
PCT Pub. Date: Jun. 22, 2017

(65) Prior Publication Data
US 2018/0355515 A1  Dec. 13, 2018

(30) Foreign Application Priority Data

Dec. 15, 2015 (EP) .................... 15200047

(51) Int. Cl.
*D01F 6/30* (2006.01)
*D01D 5/06* (2006.01)
*D01F 6/46* (2006.01)
*C08F 110/02* (2006.01)
*D01F 6/04* (2006.01)
*C08F 10/02* (2006.01)

(52) U.S. Cl.
CPC ............ *D01F 6/04* (2013.01); *C08F 10/02* (2013.01); *D01D 5/06* (2013.01); *D01F 6/30* (2013.01); *D01F 6/46* (2013.01); *D10B 2321/0211* (2013.01); *D10B 2401/062* (2013.01)

(58) Field of Classification Search
CPC .... D01F 6/30; D01F 6/46; D01D 5/06; D10B 2321/0211; D10B 2401/062; C08F 110/02
See application file for complete search history.

(56) References Cited

U.S. PATENT DOCUMENTS 9,005,753 B2 * 4/2015 Simmelink ............. D01D 5/04
428/364
9,534,066 B2 * 1/2017 Boesten .................... D01F 6/04
2011/0268967 A1 11/2011 Tam et al.
2014/0106104 A1 4/2014 Boesten et al.
2015/0241177 A1 * 8/2015 Simmelink ........... F41H 5/0478
89/36.02

FOREIGN PATENT DOCUMENTS

| CN | 1902343 | 1/2007 |
|---|---|---|
| EP | 1 699 954 | 9/2006 |
| EP | 1 749 574 | 2/2007 |
| JP | 06-280111 | 10/1994 |
| WO | 2005/066400 | 7/2005 |
| WO | 2005/066401 | 7/2005 |
| WO | 2006/040190 | 4/2006 |
| WO | 2008/058749 | 5/2008 |
| WO | 2009/043597 | 4/2009 |
| WO | 2009/056286 | 5/2009 |
| WO | 2012/139934 | 10/2012 |
| WO | 2013/131996 | 9/2013 |
| WO | 2014/187948 | 11/2014 |
| WO | 2015/059280 | 4/2015 |

OTHER PUBLICATIONS

International Search Report for PCT/EP2016/080569, dated Feb. 9, 2017, 4 pages.
Written Opinion of the ISA for PCT/EP2016/080569, dated Feb. 9, 2017, 6 pages.
"Advanced Fiber Spinning Technology" Edited by T. Nakajima, Woodhead Publishing Limited, 1994, 21 pages.
Ortin et al. "Filter-based infrared detectors for high temperature size exclusion chromatography analysis of polyolefins: calibration with a small number of standards and error analysis" Journal of Chromatography A, 1257, 2012, 66-73.
Vlasblom et al. "Predicting the Creep Lifetime of HMPE Mooring Rope Applications" *Oceans 2006*, pp. 1-10.

* cited by examiner

*Primary Examiner* — Vu A Nguyen
(74) *Attorney, Agent, or Firm* — Nixon & Vanderhye P.C.

(57) ABSTRACT

The invention relates to a process for the preparation of a gel spun UHMWPE fiber comprising the steps of providing an ultra high molecular weight polyethylene composition having an intrinsic viscosity (IV) of at least 8 dl/g, a co-monomer content (CBR) of a least 0.05 SCB/1000TC, a mass averaged distribution of the co-monomer (CMAD) of at least 0.05, wherein the co-monomer has at least 4 carbon atoms, dissolving the composition in a solvent to form a polymer solution having a UHMWPE concentration of between 2 and 40 wt %, spinning the polymer solution through a multi orifice die plate to form a solution fibers, cooling the solution fiber to below 80° C. to form a gel fiber, drawing the fiber in at least one step to form a drawn fiber, removing at least a portion of the solvent before, during or after the drawing, wherein the ratio CMAD to CBR is greater than 1.0. The invention further relates to a gel-spun UHMWPE fiber obtainable by the process and products comprising said gel-spun UHMWPE fiber.

30 Claims, No Drawings

LOW CREEP FIBER

This application is the U.S. national phase of International Application No. PCT/EP2016/080569 filed Dec. 12, 2016, which designated the U.S. and claims priority to EP 15200047.7 filed Dec. 15, 2015, the entire contents of each of which are hereby incorporated by reference.

This invention relates to a process to manufacture a creep-optimized, ultra high molecular weight polyethylene (UHMWPE) fiber, the fiber obtainable by such process and various products such as ropes, nets, chains, medical devices, fabrics, laminates, composite articles and ballistic-resistant articles containing said UHMWPE fibers.

During the last decades, many research projects focused on improving the creep properties of synthetic fibers, since such fibers are extremely suitable for a wide range of applications where lightweight and strength are driving factors. One example of synthetic fibers is UHMWPE fibers, which meet successfully the weight and strength requirements. The almost unmatched strength of UHMWPE fibers combined with ultraviolet resistance, chemical resistance, cut and abrasion resistance and other favorable properties are the reasons that these fibers found an almost immediate utilization in rope mooring, composite reinforcement, medical devices, cargo nets and the like.

UHMWPE fibers have however one drawback which acts as an impediment for their optimal utilization in long-term applications, this drawback being related to their creep behavior. It was observed that the ultimate failure mode of a system using UHMWPE fibers and in particular of those systems placed under a long-term load, is rupture or failure due to creep. More recently creep properties of UHMWPE fibers have been successfully improved making them suitable for above mentioned applications and resulting in first commercial creep optimized products such as the UHMWPE yarn sold by DSM Dyneema, the Netherlands under the trade name DM20.

Examples of UHMWPE fibers having a good creep behavior and a process for producing thereof are known from EP 1,699,954; disclosing UHMWPE fibers having creep rates as low as $1 \times 10^{-6}$ sec$^{-1}$ as measured at 70° C. under a load of 600 MPa and tensile strengths as high as 4.1 GPa.

WO 2009/043597 also disclose UHMWPE fibers having a good combination of creep rate and tensile strength, e.g. a creep rate of at most $5 \times 10^{-7}$ sec$^{-1}$ as measured at 70° C. under a load of 600 MPa, and a tensile strength of at least 4 GPa.

WO 2012/139934 and WO 2014/187948 disclose UHMWPE fibers having substantially increased creep life time, e.g. reporting yarns with life time of greater than 500 hours as measured at 70° C. under a load of 600 MPa.

Since long it was recognized, amongst others by the inventors of JP 6 280111, that manufacturing fibers from branched UHMWPE polymers may produce fibers having good creep resistance. It was observed that good creep properties can be achieved by sufficient length and amounts of branches in the UHMWPE. Nevertheless increasing length and amount of branches may negatively affect the fiber spinning process. Furthermore, UHMWPE polymer with high levels of co-monomer are more difficult to produce and are economically less attractive, whereas length and number of branches may disrupt the fiber structure with negative effects on the fiber properties.

An aim of the present invention may therefore be to provide an improved UHMWPE fiber gel spinning process wherein above mentioned problems are absent or present to a lesser extent, while maintaining creep and strength properties at a commercially interesting level. Especially the gel spinning process according to the invention may be more economical, and strike a balance between the amount of branches in the UHMWPE and the mechanical properties of the gel-spun fiber.

Accordingly one embodiment of the invention provides a process for producing creep-optimized UHMWPE fiber comprising the steps of providing an UHMWPE composition having an intrinsic viscosity (IV) of at least 8 dl/g, a co-monomer content ($C_{BR}$) of a least 0.05 short chains branches per 1000 total carbon (SCB/1000TC), a mass averaged distribution of the co-monomer ($C_{MAD}$) of at least 0.05; dissolving the UHMWPE composition in a solvent to form a polymer solution having a UHMWPE concentration of between 2 and 40 wt %; spinning the polymer solution through a multi orifice die plate to form solution fibers; cooling the solution fiber to below 80° C. to form a gel fiber; drawing the fiber in at 1 least step to form a drawn fiber; removing at least a portion of the solvent before, during or after the drawing; whereby the ratio $C_{MAD}$ to $C_{BR}$ is greater than 1.0.

It was observed that by providing an UHMWPE composition with a $C_{MAD}$ to $C_{BR}$ ratio greater than 1.0 creep optimized fibers could be produced with substantially better creep performance than the prior art products. Alternatively it was observed that yarns with strength and creep properties matching the ones of the prior art could be achieved by providing UHMWPE compositions with lower amounts of short chain branches (SCB). The inventors postulate that the balance of properties may have shifted by a more efficient use of a lower amount of short chain branches of the UHMWPE composition to achieve equal mechanical performance.

Where a reduction of short chain branches in the prior art processes would improve production robustness such change would also negatively affects creep performance of the obtained yarns. In the light of the current invention it was observed that the deterioration of creep properties resulting from the overall reduction of SCB can be compensated by providing a UHMWPE composition having a mass averaged distribution of the co-monomer greater than the co-monomer content expressed in SCB/1000TC. Said characteristic of the UHMWPE composition may in less scientific terms be expressed as an inhomogeneous distribution of the co-monomer across the molecular weight, whereby the relative concentration of the co-monomer increases with increasing molecular weight of the polyethylene chains. The characteristic of the UHMWPE composition is expressed in the mass averaged distribution of the co-monomer, $C_{MAD}$, and is determined by Formula 1.

$$C_{MAD} = \frac{\int_0^\infty br(M) \cdot M \cdot \frac{dw}{dM} dM}{\int_0^\infty M \cdot \frac{dw}{dM} dM} \quad \text{Formula 1}$$

wherein $$\frac{dw}{dM}$$

is the molecular weight distribution of the UHMWPE; br(M) is the co-monomer distribution, expressed as the number of branches per 1000 total carbon in the molecules of UHMWPE, having molar mass M.

The parameters $$\frac{dw}{dM}$$

and br(M) for a UHMWPE composition can conveniently be established as provided in the Methods.

The UHMWPE composition provided to the inventive process has an intrinsic viscosity of at least 8 dl/g, a short chain branching concentration ($C_{BR}$) of a least 0.05 SCB/1000TC, a mass averaged distribution of the co-monomer ($C_{MAD}$) of at least 0.05 and a ratio $C_{MAD}$ to $C_{BR}$ greater than 1.0. Preferably the ratio $C_{MAD}$ to $C_{BR}$ is greater than 1.05, preferably greater than 1.1. Such increase of the ratio to higher levels may allow a further reduction of the total branching content of the UHMWPE composition of the inventive fibers. Increasing the ratio can be achieved by adjusting both, the $C_{MAD}$ or the $C_{BR}$ or a combination thereof and will depend on the intended improvement to be achieved.

Whereas there are different means to provide UHMWPE compositions according to the inventive process such as producing a corresponding UHMWPE composition via an ethylene polymerization process or combination of such processes, the inventors identified that a suitable mean to provide the UHMWPE is in that the UHMWPE composition comprises at least 2 different UHMWPE polymers, A and B. Such a way to provide the UHMWPE composition is preferred since it does not rely on availability of a suitable commercial UHMWPE polymer, which to inventors best knowledge is not readily available, but can be provided by judiciously selecting different UHMWPE polymers A and B. By different is understood that the 2 UHMWPE polymers differ from each other by at least one physical or chemical property, such as molecular weight, co-monomer concentration, molecular weight distribution. In a preferred embodiment the UHMWPE composition comprises UHMWPE polymer A having an IV of 8-40 dl/g, and a $C_{BR}$ of less than 0.1 SCB/1000TC, preferably of less than 0.05 SCB/1000TC, and/or a UHMWPE polymer B having an IV of 8-40 dl/g, and a $C_{BR}$ from 0.1 to 5.0 SCB/1000TC, more preferably from 0.2 to 2.5 SCB/1000TC and even more preferably from 0.3 to 1.5 SCB/1000TC. Such preferred combination of polymer A and B provides a UHMWPE composition with $C_{MAD}$ and $C_{BR}$ respecting the inventive characteristics.

In a further preferred embodiment of the invention the ratio of the IV of polymer A to the IV of polymer B is less than 1, preferably at most 0.9, more preferably at most 0.8, even more preferably at most 0.7 and most preferably at most 0.5. By providing polymers A and B with said specific IV ratio the robustness of the production process of creep optimized fibers may be further improved. An alternative way to characterize the UHMWPE composition according to such preferred embodiment is that the molecular weight distribution of the UHMWPE composition may show bimodality expressed as a double peak or at least a deviation from the typical monomodal distribution as described by e.g. Gaussian, Log-Normal or Schulz-Flory molecular weight distribution.

The UHMWPE polymers A and B of the UHMWPE composition may be combined in any ratio one to another, preferably the weight ratio of polymer A to polymer B is between 0.02 and 50, preferably between 0.05 and 20, more preferably between 0.1 and 10 and most preferably between 0.25 and 4. The inventors identified that for ratios of polymer A to polymer B deviating substantially from the preferred ranges only small improvements in the process may be observed or substantial differences between polymer A and B, for example short chain branching or IV, are required.

The UHMWPE composition and/or the UHMWPE polymers A and B may be obtained by polymerization processes known in the art. Preferably, the UHMWPEs used according to the invention are obtained by a slurry polymerization process in the presence of an olefin polymerization catalyst at a polymerization temperature, whereby the polymerization catalyst may be a Ziegler (Z) or molecular catalyst (MC) characterized by their single-site nature, to which the well-known metallocene catalysts belong. Preferably, the Ziegler polymerization catalyst used is a Titanium based catalyst for producing UHMWPE. Examples of suitable catalysts are described in WO 2008/058749 or EP 1 749 574 included herein by reference. Molecular catalysts and therewith produced UHMWPEs are for example described in WO2015/059280 included herein by reference. Whereas each individual catalyst system may provide UHMWPE polymers with specific characteristics and advantages for the present invention, the inventors identified that advantageous processing conditions can be achieved by selecting a polymer A produced by a ZN catalyst and polymer B produced by a single-site catalyst. Accordingly a preferred embodiment of the invention is a process wherein polymer A is a Z polymer and polymer B is a MC polymer.

In one preferred embodiment, the UHMWPE composition used in the process of the invention has a polydispersity index (PDI), also commonly called molecular weight distribution Mw/Mn, of at least 2.5, preferably at least 3.0, more preferably than 3.5 and most preferably at least 4.0. Such preferred UHMWPE composition may demonstrate even further improved gel spinning processing. By PDI in the context of the present application is understood the ratio of Mw/Mn. Since there may be conflicting teachings in the literature about the way to measure Mw and/or Mn values for a UHMWPE, resulting in a discrepancy of the molecular weight distribution, the herein understood PDI is the one as measured by SEC technique as further described in the experimental section. The PDI of the UHMWPE composition used in the process of the invention may have an upper limit of at most 50.

Where the UHMWPE composition is attained by combining at least 2 polymer A and B, the individual polymers A and B are not bound by above limitations. In a preferred embodiment of the invention, polymer A has a PDI of at least 2.5, preferably at least 3.0, more preferably than 3.5 and most preferably at least 4.0. In another preferred embodiment of the invention polymer B has a PDI of at most 4.0, preferably of at most 3.5, more preferably of at most 3.0 and most preferably of at most 2.5. In a yet preferred embodiment of the invention the PDI of polymer A is greater than the PDI of polymer B.

The co-monomer present in the UHMWPE composition, the UHMWPE polymer A and/or the UHMWPE polymer B has at least 4 carbon atoms and will result in short chain branches (SCB) of the UHMWPE. The nature of the co-monomer is not specifically limited other than that it comprises at least one polymerizable C—C double bond. Preferably the co-monomer is one or more monomers selected from the group consisting of alpha-olefins with at least 4 carbon atoms, cyclic olefins having 5 to 20 carbon atoms and linear, branched or cyclic dienes having 4 to 20 carbon atoms, more preferably the co-monomer is one or more monomers selected from the group consisting of 1-butene, 1-pentene, 1-hexene, 1-octene. Good results were obtained with 1-butene and 1-hexene providing ethyl and butyl branches to the UHMWPE composition, more preferably to the UHMWPE polymer B.

Another embodiment of the invention concerns the gel spun UHMWPE fiber obtainable by the herein described inventive process. The UHMWPE of the inventive fibers will have properties substantially corresponding to the properties of the UHMWPE composition used in the innovative preparation process described above. Nevertheless some or all properties of the UHMWPE composition may not be present at an identical level in the UHMWPE of the fiber of the invention due to the chemical, thermal and/or mechanical process to which said UHMWPE composition was subjected. Preferably the gel spun fiber according to the invention comprises a UHMWPE having an intrinsic viscosity (IV) of at least 4 dl/g, a co-monomer content ($C_{BR}$) of a least 0.05 SCB/1000TC, a mass averaged distribution of the co-monomer ($C_{MAD}$) of at least 0.05, whereby the ratio $C_{MAD}$ to $C_{BR}$ is greater than 1, preferably greater than 1.05, more preferably greater than 1.1 and most preferably greater than 1.2.

By fiber is herein understood an elongated body, e.g. a body having a length and transverse dimensions, wherein the length of the body is much greater than its transverse dimensions. The fiber may have regular or irregular cross-sections. The fiber may also have a continuous and/or a discontinuous length. Preferably, the fiber has a continuous length, such fiber being known in the art as a filament. The term fiber as used herein may also include various embodiments including filament, staple fiber, tape, strip and ribbon. Within the context of the invention, a yarn is understood to be an elongated body comprising a plurality of fibers.

Preferably, the UHMWPE fibers and in particular those spun from UHMWPE compositions having ethyl or butyl branches, have a tenacity of at least 25 cN/dtex, more preferably of at least 32 cN/dtex, most preferably of at least 38 cN/dtex. Preferably, the inventive UHMWPE fibers and in particular those spun from UHMWPE compositions having ethyl or butyl branches, have an elastic modulus of at least 1100 cN/dtex, more preferably of at least 1200 cN/dtex, most preferably of at least 1300 cN/dtex. It was observed that in addition to the excellent creep properties, the inventive UHMWPE fibers have also good tensile properties.

According to the invention, the inventive UHMWPE fibers are obtained by a gel spinning process, in the art such fibers being also referred to as "gel-spun UHMWPE fibers". For the present invention, by gel-spinning process is meant a process comprising at least the steps of (a) dissolving the composition in a solvent to form a polymer solution having a UHMWPE concentration of between 2 and 40 wt %, (b) spinning the polymer solution through a multi orifice die plate to form solution fibers, (c) cooling the solution fiber to below 80° C. to form a gel fiber, (d) drawing the fiber in at least one step to form a drawn fiber and (e) removing at least a portion of the solvent before, during or after the drawing. The gel-spinning process may optionally contain more than one drawing step wherein the gel fiber and/or the solid fiber are drawn with a certain draw ratio. Gel spinning processes are known in the art and are disclosed for example in WO 2005/066400; EP 1,699,954 and in "*Advanced Fibre Spinning Technology*", Ed. T. Nakajima, Woodhead Publ. Ltd (1994), ISBN 185573 182 7, these publications and the references cited therein being included herein by reference.

According to the invention, a gel-spinning process is used to manufacture the inventive UHMWPE fibers, wherein as already mentioned hereinabove, the UHMWPE composite is used to produce an UHMWPE solution, which is subsequently spun through a spinneret and the obtained gel fiber is dried to form a solid fiber.

The UHMWPE solution is preferably prepared with a UHMWPE concentration of at least 3 wt %, more preferably of at least 5 wt %. Preferably the UHMWPE concentration in the solvent is between 3 and 25 wt %, more preferably between 5 and 15 wt %. Preferably, the concentration is between 3 and 25 wt % for UHMWPE with an IV of the UHMWPE composition in the range 8-40 dl/g, preferably 12-30 dl/g.

To prepare the UHMWPE solution, any of the known solvents suitable for gel spinning the UHMWPE may be used. Such solvents are also referred to herein as "spinning solvents". Suitable examples of solvents include aliphatic and alicyclic hydrocarbons, e.g. octane, nonane, decane and paraffins, including isomers thereof; petroleum fractions; mineral oil; kerosene; aromatic hydrocarbons, e.g. toluene, xylene, and naphthalene, including hydrogenated derivatives thereof, e.g. decalin and tetralin; halogenated hydrocarbons, e.g. monochlorobenzene; and cycloalkanes or cycloalkenes, e.g. careen, fluorine, camphene, menthane, dipentene, naphthalene, acenaphtalene, methylcyclopentandien, tricyclodecane, 1,2,4,5-tetramethyl-1,4-cyclohexadiene, fluorenone, naphtindane, tetramethyl-p-benzodiquinone, ethylfuorene, fluoranthene and naphthenone. Also combinations of the above-enumerated solvents may be used for gel spinning of UHMWPE, the combination of solvents being also referred to for simplicity as solvent. In a preferred embodiment, the solvent of choice is not volatile at room temperature, e.g. paraffin oil. It was also found that the process of the invention is especially advantageous for relatively volatile solvents at room temperature, as for example decalin, tetralin and kerosene grades. In the most preferred embodiment the solvent of choice is decalin.

The UHMWPE solution is then formed into gel filaments by spinning said solution through a multi orifice die plate, also called spinneret. By multi orifice die plate is herein understood a spinneret containing preferably at least 100, yet even more preferably at least 300, most preferably at least 500 spinholes. Preferably, the spinning temperature is between 150° C. and 300° C., more preferably said temperature is chosen below the boiling point of the spinning solvent. If for example decaline is used as spinning solvent the spinning temperature is preferably at most 190° C.

The gel filaments formed by spinning the UHMWPE solution through the spinneret may be extruded into an air gap, and then into a cooling zone where they are cooled to below 80° C. to form gel fibers or gel filaments from where they are picked-up on a first driven roller. Preferably, the gel filaments are stretched in the air gap. In the cooling zone, the gel filaments are cooled preferably in a gas flow and/or in a liquid bath.

Subsequently to forming the gel filaments, said gel filaments are subjected to a solvent extraction step wherein the spinning solvent used to manufacture the UHMWPE solution is at least partly removed from the gel filaments to form solid filaments. The solvent removal process may be performed by known methods, for example by evaporation when a relatively volatile spinning solvent, e.g. decaline, is used or by using an extraction liquid, e.g. when paraffin is used as spinning solvent, or by a combination of both methods. Preferably the gel filaments are drawn with a draw ratio of preferably at least 1.2, more preferably at least 1.5, most preferable at least 2.0.

Preferably, the solid filaments are also drawn during and/or after said removal of the solvent. Preferably, the drawing of the solid filaments is performed in at least one drawing step with a draw ratio of preferably at least 4, more preferably at least 7, even more preferably at least 10. More preferably, the drawing of solid filaments is performed in at least two steps, even more preferably in at least three steps.

The inventive gel spun fiber or yarns comprising the gel spun fibers are suitable fibers and yarns for typical fiber applications. Hence one embodiment of the present invention concerns a product comprising the inventive gel spun fiber, preferably the product is selected from the group consisting of yarns, ropes, cables, nets, fabrics, and protective appliances such as ballistic resistant articles.

The inventive UHMWPE fibers have properties which make them an interesting material for use in ropes, cordages and the like, preferably ropes designed for heavy-duty operations as for example marine, industrial and offshore operations. Rigging ropes and ropes used in sports applications such as yachting, climbing, kiteflying, parachuting and the like are also applications where the fibers of the invention may perform well. In particular it was observed that the inventive UHMWPE fibers are particularly useful for long-term and ultralong-term heavy-duty operations.

Heavy duty operations may further include, but not restricted to, crane ropes, ropes for deep-sea deployment or recovery of hardware, anchor handling, mooring of support platforms for offshore renewable energy generation, mooring of offshore oil drilling rigs and production platforms such as offshore production platforms and the like. It was surprisingly observed that for such operations, and in particular for offshore mooring, the installation of ropes designed therefor may be optimized, e.g. the ropes can be installed using less complex hardware or smaller and lighter installation equipment.

The inventive UHMWPE fibers are also very suitable for use as a reinforcing element, for example in a liner, for reinforced products such as hoses, pipes, pressurized vessels, electrical and optical cables, especially when said reinforced products are used in deepwater environments where reinforcement is required to support the load of the reinforced products when free hanging. The invention therefore also relates to a liner and a reinforced product containing reinforcing elements or containing said liner, wherein the reinforcing elements or the liner contain the inventive UHMWPE fibers.

Most preferably, the inventive UHMWPE fibers are used in applications where said fibers experience static tension or static loads and in particular long-term and ultralong-term static tension or static loads. By static tension is herein meant that the fiber in application always or most of the time is under tension irrespective if the tension is at constant level (for example a weight hanging freely in a rope comprising the fiber) or varying level (for example if exposed to thermal expansion or water wave motion). Examples of applications wherein static tensions are encountered are for example many medical applications (for example cables and sutures) but also mooring ropes, and tension reinforcement elements, as the improved creep lifetime of the present fibers leads to improved performances of these and similar applications. A particular application of the inventive UHMWPE fibers is in crane ropes where the rope can reach an elevated temperature as result of (1) ambient temperatures and/or (2) internal heat generation due to friction around crane sheaves.

The invention further relates to composite articles containing the inventive UHMWPE fibers. In a preferred embodiment, the composite article contains at least one mono-layer comprising the UHMWPE fibers of the invention. The term mono-layer refers to a layer of fibers, i.e. fibers in one plane. In a further preferred embodiment, the mono-layer is a unidirectional mono-layer. The term unidirectional mono-layer refers to a layer of unidirectionally oriented fibers, i.e. fibers in one plane that are essentially oriented in parallel. In a yet further preferred embodiment, the composite article is multi-layered composite article, containing a plurality of unidirectional mono-layers the direction of the fibers in each mono-layer preferably being rotated with a certain angle with respect to the direction of the fibers in an adjacent mono-layer. Preferably, the angle is at least 30°, more preferably at least 45°, even more preferably at least 75°, most preferably the angle is about 90°. Multi-layered composite articles proved very useful in ballistic applications, e.g. body armor, helmets, hard and flexible shield panels, panels for vehicle armoring and the like. Therefore, the invention also relates to ballistic-resistant articles as the ones enumerated hereinabove containing the UHMWPE fibers of the invention.

The inventive UHMWPE fibers of the invention are also suitable for use in medical devices, e.g. sutures, medical cables, implants, surgical repair products and the like. The invention therefore further relates to a medical device, in particular to a surgical repair product and more in particular to a suture and to a medical cable comprising the UHMWPE fibers of the invention.

It was also observed that the inventive UHMWPE fibers are also suitable for use in other applications like for example, synthetic chains, conveyor belts, tensiarity structures, concrete reinforcements, fishing lines and fishing nets, ground nets, cargo nets and curtains, kite lines, dental floss, tennis racquet strings, canvas (e.g. tent canvas), nonwoven cloths and other types of fabrics, webbings, battery separators, capacitors, pressure vessels (e.g. pressure cylinders, inflatables), hoses, (offshore) umbilical cables, electrical, optical fiber, and signal cables, automotive equipment, power transmission belts, building construction materials, cut and stab resistant and incision resistant articles, protective gloves, composite sports equipment such as skis, helmets, kayaks, canoes, bicycles and boat hulls and spars, speaker cones, high performance electrical insulation, radomes, sails, geo-textiles such as mats, bags and nets, and the like. Therefore, the invention also relates to the applications enumerated above containing the UHMWPE fibers of the invention.

The invention also relates to an elongated object comprising a plurality of the UHMWPE fibers of the invention, wherein said fibers are at least partly fused to each other. In one embodiment said elongated object is a monofilament. In a different embodiment, said elongated object is a tape. By at least partly fused fibers is herein understood that individual fibers are fused at multiple locations along their length and disconnected between said locations. Preferably, said fibers are fully fused to each other, i.e. the individual fibers are fused to each other over essentially their whole length. Preferably, the fusing is carried out by at least compressing said plurality of UHMWPE fibers under a temperature lower than the melting temperature of the fibers. The melting temperature of the fibers can be determined by DSC using a methodology as described at pg. 13 of WO 2009/056286. Processes of fusing UHMWPE fibers into monofilaments and tapes are known in the art and disclosed for example in WO 2006/040190, WO 2009/056286 and WO 2013/131996. It was observed that by using the fibers of the invention, monofilaments and tapes having optimized creep properties were achieved. Such products were suitable for utilization in applications such as fishing lines; liners; reinforcing elements; antiballistic articles such as armors; car parts; and architectural applications such as doors.

The invention will be further explained by the following examples and comparative experiment, however first the methods used in determining the various parameters used hereinabove are presented.

Methods of Measurement:

- IV: the Intrinsic Viscosity for UHMWPE is determined according to ASTM D1601/2004 at 135° C. in decalin, while shaking the mixture for 16 hours, with BHT (Butylated Hydroxy Toluene) as anti-oxidant in an amount of 2 g/l solution. IV is obtained by extrapolating the viscosity as measured at different concentrations to zero concentration.
- dtex: fibers' titer (dtex) was measured by weighing 100 meters of fiber. The dtex of the fiber was calculated by dividing the weight in milligrams by 10;
- Tensile properties of fibers and yarns: tensile strength (or strength) and tensile modulus (or modulus) and elongation at break are defined and determined on multifilament yarns as specified in ASTM D885M, using a nominal gauge length of the fiber of 500 mm, a crosshead speed of 50%/min and Instron 2714 clamps, of type "Fiber Grip D5618C". On the basis of the measured stress-strain curve the modulus is determined as the gradient between 0.3 and 1% strain. For calculation of the modulus and strength, the tensile forces measured are divided by the titer; values in GPa are calculated assuming a density of the UHMWPE of 0.97 g/cm$^3$.
- Branching ($C_{BR}$), i.e. the number of short chain branches, e.g. ethyl or butyl side chains, per thousand total carbon atoms (SCB/1000TC): was determined by FTIR on a 2 mm thick compression molded film by quantifying the absorption at 1375 cm$^{-1}$ using a calibration curve based on NMR measurements as in e.g. EP 0 269 151 (in particular pg. 4 thereof).
- Creep properties were determined in accordance with the methodology described in the paper "*Predicting the Creep Lifetime of HMPE Mooring Rope Applications*" by M. P. Vlasblom and R. L. M. Bosman—Proceedings of the MTS/IEEE OCEANS 2006 Boston Conference and Exhibition, held in Boston, Mass. on Sep. 15-21, 2006, Session Ropes and tension Members (Wed 1:15 PM-3:00 PM) and as further detailed in WO2009/043597, pages 18 to 20.
- SEC-MALS: The molecular mass distributions (Mn, Mw, Mz, Mw/Mn) were measured using a PL-210 Size Exclusion Chromatograph coupled to a multi-band infrared detector (IR5 PolymerChar) and a multi-angle light scattering (MALS) detector (laser wavelength 690 nm) from Wyatt (type DAWN EOS). Two PL-Mixed A columns were used. 1,2,4-trichlorobenzene was used as the solvent, the flow rate was 0.5 ml/min, and the measuring temperature was 160° C. Data acquisition and calculations were carried out via Wyatt (Astra) software. The UHMWPE should be completely dissolved under such conditions that polymer degradation is prevented by methods known to a person skilled in the art.
- Co-monomer distribution or the co-monomer incorporation over the molar mass, br(M), was obtained from infrared data collected with infrared detector IR5. The detector and analytical techniques are described by Ortin et al. (Journal of Chromatography A, 1257, 2012, 66-73). The detector contains band filters which allow separating $CH_3$ and $CH_2$ signals during chromatographic run and determine the number of methyl groups per one thousand total carbons over the molar mass distribution. The detector is calibrated with polyethylene short chain branching calibration standards characterized by NMR. The standards are samples with different co-monomer type (ethyl and butyl branches).
- For practical purposes, if the co-monomer distribution br(M) of a polyethylene sample was below the accuracy of the IR measurement, the following procedure was used.
- First, a reference polyethylene sample was synthesized, with a higher co-monomer dosage during reaction and otherwise polymerization conditions identical to the sample under the scope. The co-monomer level during the polymer synthesis of the reference sample was chosen such, that it led to a co-monomer distribution $br_{ref}(M)$ well-detectable by the IR method, as can be judged by a person skilled in the art.
- Secondly, the branching in the reference sample $C_{BRref}$ and in the sample under the scope $C_{BR}$ were measured by the corresponding method, as described above. Finally, the co-monomer distribution br(M) of the sample under the scope was calculated by Formula 2

$$br(M) = br_{ref}(M) \cdot \frac{C_{BR}}{C_{BRref}} \qquad \text{Formula 2}$$

Co-Monomer Mass Average Distribution ($C_{MAD}$):

In order to characterize the degree to which the co-monomer is distribute across the molecular weight of the polymer, the SEC-MALS with online IR was used to calculate a parameter named co-monomer mass average distribution, $C_{MAD}$. Its definition is given by the Formula 1

$$C_{MAD} = \frac{\int_0^\infty br(M) \cdot M \cdot \frac{dw}{dM} dM}{\int_0^\infty M \cdot \frac{dw}{dM} dM} \qquad \text{Formula 1}$$

wherein $$\frac{dw}{dM}$$

is the number weight distribution of the UHMWPE composition, as obtained by, e.g., SEC-IR; br(M) is the co-monomer distribution (co-monomer incorporation over the molar mass), expressed as the number of branches per 1000 total carbon in the molecules of UHMWPE composition, having molar mass M, as measured by SEC-IR.

For practical purposes, the integration in Formula 1 can be substituted by a summation as shown in Formula 3

$$C_{MAD} = \frac{\sum_{i=1}^{N} br(M_i) \cdot M_i \cdot w_i}{\sum_{i=1}^{N} M_i \cdot w_i} \qquad \text{Formula 3}$$

where $w_i$ is the normalized weight fraction of the material fraction with molar mass $M_i$ in the UHMWPE composition. The weight fraction $w_i$ can be determined, e.g., by SEC-IR.

Formulas 1 and 3 are also applicable if a blend of at least two polymers A and B is used $$C_{MAD} = \frac{X_A \cdot \left(\sum_{i=1}^{N} br(M_i) \cdot M_i \cdot w_i\right)_A + X_B \cdot \left(\sum_{i=1}^{N} br(M_i) \cdot M_i \cdot w_i\right)_B}{X_A \cdot \left(\sum_{i=1}^{N} M_i \cdot w_i\right)_A + X_B \cdot \left(\sum_{i=1}^{N} M_i \cdot w_i\right)_B} \qquad \text{Formula 4}$$

where $X_A$ and $X_B$ are the mass fractions of the polymers A and B in the blend ($X_B=1-X_A$) and the subscripts A and B indicate that the corresponding sums must be calculated for the polymer A or polymer B, respectively.

If more than two polymers (A, B, C, etc.) are blended, the Formula 4 takes the form of Formula 5

$$C_{MAD} = \frac{\sum_k X_k \cdot \left(\sum_{i=1}^{N} br(M_i) \cdot M_i \cdot w_i\right)_k}{\sum_k X_k \cdot \left(\sum_{i=1}^{N} M_i \cdot w_i\right)_k} \qquad \text{Formula 5}$$

where k=A, B, C, etc., $X_k$ is the mass fractions of the polymer k in the UHMWPE composition and whereby $\Sigma_k X_k = 1$.

Both the continuous definition, Formula 1, and its discrete version, Formula 3, emphasize the asymmetry of the co-monomer incorporation into the low and high molar mass part of the molecular weight distribution. Indeed:

If the co-monomer is incorporated homogeneously, then br(M) is constant over the whole range of molar masses M and, therefore, $C_{MAD}=C_{BR}$.

If the co-monomer is preferentially present in the higher molar mass molecules, then $C_{MAD}>C_{BR}$.

If the co-monomer is preferentially present in the lower molar mass molecules, then $C_{MAD}<C_{BR}$.

Preparation of UHMWPE

Molecular catalyst polymerized UHMWPE: 7 UHMWPE polymers have been synthesized as ethylene homopolymers or copolymers of ethylene with 1-butene or 1-hexene. The polymerization procedure as described in WO 2015/059280 with the molecular catalyst (MC) of Example 4 described therein. Details of the produced polymers I, III, IV, V, VII and VIII are reported in table 1.

Ziegler catalyst polymerized UHMWPE: 2 UHMWPE polymers have been synthesized according to the general preparation process described in WO 2012/139934 with a supported Ziegler catalyst (Z). Details of the produced polymers II and VI are reported in table 1.

Preparation of UHMWPE Compositions

Prior to gel-spinning the fibers, the prepared UHMWPE polymers have been blended by tumbling and later dispersion in the spinning solvent to form UHMWPE compositions. In case of blends of polymers, $C_{BR}$ and $C_{MAD}$ have been established by considering the $C_{BR}$ and $C_{MAD}$ of the individual polymers and their weight ratio in the composition.

Gel Spinning Process

A process such as the one disclosed in WO 2005/066401 was used to produce UHMWPE fibers from the described UHMWPE polymers or compositions. In particular, the UHMWPE solution was extruded with at a temperature setting of 180° C. through a spinneret having a 25 spinholes into an air atmosphere containing also decalin and water vapors with a rate of about 1.5 g/min per hole.

The spinholes had a circular cross-section and consisted of a gradual decrease in the initial diameter from 2 mm to 0.8 mm with a cone angle of 15° followed by a section of constant diameter of 0.5 mm length, this specific geometry of the spinholes introducing a draw ratio in the spinneret of 6.25.

From the spinneret the fluid fibers entered an air gap and then into a water bath, where the fluid fibers were taken up at a velocity 10 times higher than their velocity at the spinneret outlet, introducing a draw ratio in the air gap of 10.

The fluid fibers were cooled in the water bath to form gel fibers, the water bath being kept at about 40° C. and wherein a water flow was being provided with a flow rate of about 50 liters/hour perpendicular to the fibers entering the bath. From the water bath, the gel fibers were taken-up into an oven at a temperature of 90° C. wherein partial solvent evaporation occurred to form solid fibers.

The solid fibers were drawn in a first step at around 130° C. and in a second step at around 145° C. by applying a total solid draw ratio during which process most of the solvent evaporated. The total solid draw ratio is the product of the solid draw ratios used in the first and second drawing step.

All reported samples were drawn to achieve a modulus of approximately 1200 cN/dtex and a strength of approximately 35 cN/dtex.

The fibers' creep rates and the measurement conditions (temperature and load) for the Comparative Experiments A to D and of the Examples 1 to 3, are reported in Table 1. From said table it can be seen that for equal type of branching and comparable total short chain branching concentration the fibers of the invention have substantially increased creep rates. Alternatively it can be observed that similar creep rates can be attained by the inventive fibers at a substantially lower total amount of short chain branches $C_{BR}$ of the UHMWPE composition.

TABLE 1

| polymer | | Mn kg/mol | Mw kg/mol | PDI — | Cat | branching/ 1000C | Co-mon. | Fraction wt % | $C_{BR}$/ 1000C | $C_{MAD}$ | $C_{MAD}/C_{BR}$ | Creep rate 1/s | creep cond. MPa/° C. |
|---|---|---|---|---|---|---|---|---|---|---|---|---|---|
| Examples | | | | | | | | | | | | | |
| 1 | I | 1500 | 3400 | 2.2 | MC | 0.51 | 1-butene | 60 | 0.31 | 0.314 | 1.011 | 1.30E-08 | 600/50 |
|  | II | 530 | 3300 | 6.2 | Z | 0 |  | 40 |  |  |  |  |  |
| 2 | III | 1610 | 3990 | 2.5 | MC | 0.6 | 1-butene | 70 | 0.42 | 0.544 | 1.296 | 3.20E-05 | 600/90 |
|  | IV | 190 | 960 | 4 | MC | 0 |  | 30 |  |  |  |  |  |
| 3 | V | 1310 | 3120 | 2.4 | MC | 0.4 | 1-hexene | 70 | 0.28 | 0.354 | 1.263 | 9.00E-07 | 300/90 |
|  | IV | 190 | 960 | 4 | MC | 0 |  | 30 |  |  |  |  |  |
| Comp. Exp. | | | | | | | | | | | | | |
| A | VI | 595 | 3100 | 5.2 | Z | 0.7 | 1-butene | 100 | 0.7 | 0.441 | 0.630 | 2.60E-08 | 600/50 |
| B | VI | 595 | 3100 | 5.2 | Z | 0.7 | 1-butene | 100 | 0.7 | 0.441 | 0.630 | 4.70E-05 | 600/90 |
| C | VII | 38 | 110 | 2.9 | MC | 6.5 | 1-hexene | 10 | 0.65 | 0.025 | 0.038 | 6.00E-06 | 300/90 |
|  | II | 530 | 3300 | 6.2 | Z | 0 |  | 90 |  |  |  |  |  |
| D | VIII | 380 | 1100 | 2.9 | MC | 0.66 | 1-butene | 50 | 0.33 | 0.176 | 0.532 | 2.23E-07 | 600/50 |
|  | II | 530 | 3300 | 6.2 | Z | 0 |  | 50 |  |  |  |  |  |

The invention claimed is:

1. A process for the preparation of a gel spun ultrahigh molecular weight polyethylene (UHMWPE) fiber comprising the steps of:
   (a) providing an ultra high molecular weight polyethylene (UHMWPE) composition having an intrinsic viscosity (IV) of at least 8 dl/g, a co-monomer content ($C_{BR}$) of a least 0.05 SCB/1000TC, and a mass averaged distribution of the co-monomer ($C_{MAD}$) of at least 0.05, wherein the co-monomer has at least 4 carbon atoms and a ratio of $C_{MAD}$ to $C_{BR}$ is greater than 1.0,
   (b) dissolving the composition in a solvent to form a polymer solution having a UHMWPE concentration of between 2 and 40 wt %,
   (c) spinning the polymer solution through a multi orifice die plate to form a solution fiber,
   (d) cooling the solution fiber to below 80° C. to form a gel fiber,
   (e) drawing the gel fiber in at least one step to form a drawn fiber, and
   (f) removing at least a portion of the solvent before, during or after the drawing.

2. The process of claim 1, wherein the ratio of $C_{MAD}$ to $C_{BR}$ is greater than 1.05.

3. The process according to claim 1, wherein the UHMWPE composition comprises at least 2 different UHMWPE polymers A and B.

4. The process according to claim 3, wherein
   the UHMWPE polymer A has an IV of 8-40 dl/g, and a $C_{BR}$ of less than 0.1 SCB/1000TC, and/or
   the UHMWPE polymer B has an IV of 8-40 dl/g, and a $C_{BR}$ from 0.1 to 5.0 SCB/1000TC.

5. The process according to claim 3, wherein a ratio of the IV of the polymer A to the IV of the polymer B is less than 1.

6. The process according to claim 3, wherein the polymer A and the polymer B are present in a weight ratio of the polymer A to the polymer B which is between 0.02 and 50.

7. The process according to claim 3, wherein the polymer A is a Ziegler catalyzed polymer and the polymer B is a molecular catalyst polymer.

8. The process according to claim 1, wherein the co-monomer is one or more monomers selected from the group consisting of alpha-olefins with at least 4 carbon atoms, cyclic olefins having 5 to 20 carbon atoms and linear, branched or cyclic dienes having 4 to 20 carbon atoms.

9. The process according to claim 1, wherein the co-monomer is one or more monomers selected from the group consisting of 1-butene, 1-pentene, 1-hexene and 1-octene.

10. The process of claim 1, wherein the ratio of $C_{MAD}$ to $C_{BR}$ is greater than 1.1.

11. The process according to claim 5, wherein the ratio of the IV of the polymer A to the IV of the polymer B is at most 0.9.

12. The process according to claim 5, wherein the ratio of the IV of the polymer A to the IV of the polymer B is at most 0.8.

13. The process according to claim 6, wherein the weight ratio of polymer A to polymer B is between 0.1 and 10.

14. The process according to claim 6, whereby the weight ratio of polymer A to polymer B is between 0.25 and 4.

15. The process according to claim 9, wherein the comonomer is selected form the group consisting of 1-butene and 1-hexene to provide ethyl or butyl branches to the UHMWPE polymer B.

16. A gel spun UHMWPE fiber obtained by the process of claim 1.

17. The gel spun UHMWPE fiber of claim 16, wherein $C_{MAD}$ to $C_{BR}$ is greater than 1.2.

18. The gel spun UHMWPE fiber of claim 16, wherein the fiber has a tenacity of at least 25 cN/dtex.

19. The gel spun fiber of claim 16, wherein the fiber has a tenacity of at least 32 cN/dtex.

20. The gel spun fiber of claim 16, wherein the fiber has a tenacity of at least 38 cN/dtex.

21. A product comprising the gel spun fiber according to claim 18, wherein the product is selected from the group consisting of chains, medical devices, laminates and composite articles.

22. A product comprising the gel spun fiber according to claim 16, wherein the product is selected from the group consisting of yarns, ropes, cables, nets, fabrics, and protective appliances.

23. The product according to claim 22, wherein the product is a ballistic resistant article.

24. A product comprising the gel spun fiber according to claim 16, wherein the product is selected from the group consisting of chains, medical devices, laminates and composite articles.

25. A gel spun ultrahigh molecular weight polyethylene (UHMWPE) fiber comprising:
   an intrinsic viscosity (IV) of at least 4 dl/g,
   a co-monomer content ($C_{BR}$) of a least 0.05 SCB/1000TC, and
   a mass averaged distribution of the co-monomer ($C_{MAD}$) of at least 0.05, wherein
   a ratio of $C_{MAD}$ to $C_{BR}$ is greater than 1.

26. The gel spun UHMWPE fiber of claim 25, wherein the $C_{MAD}$ to $C_{BR}$ is greater than 1.05.

27. The gel spun UHMWPE fiber of claim 25, wherein the $C_{MAD}$ to $C_{BR}$ is greater than 1.1.

28. A product comprising the gel spun fiber according to claim 25, wherein the product is selected from the group consisting of yarns, ropes, cables, nets, fabrics, and protective appliances.

29. The product according to claim 28, wherein the product is a ballistic resistant article.

30. A product comprising the gel spun fiber according to claim 25, wherein the product is selected from the group consisting of chains, medical devices, laminates and composite articles.

* * * * *